3,369,861
METHOD FOR PRODUCING AMMONIUM CHROMATE
Alvin L. Benham, Littleton, Colo., and Harold D. McBride, Lincoln, Nebr., assignors to Marathon Oil Company
No Drawing. Filed Oct. 9, 1964, Ser. No. 402,958
4 Claims. (Cl. 23—56)

The present invention relates to a method for converting trivalent chromium, Cr (III), to hexavalent chromium, Cr (VI). More specifically, the present invention is concerned with the conversion of chromic oxide, $Cr_2O_3$ to ammonium chromate, $(NH_4)_2CrO_4$.

It has been found that ammonium chromate and ammonium dichromate are highly useful for the oxidation of alkyl aromatic compounds to acid and amide derivatives. The hydrocarbon oxidation reactions are more fully described in a co-pending application of the same assignee, Ser. No. 408,884, filed Nov. 4, 1964, by Dennis E. Drayer.

In the course of the reactions described in the previously identified application, the ammonium chromate or dichromate oxidizing agent is converted to chromic oxide. In order to make this process economically feasible, an efficient method must be provided to convert the by-product chromic oxide back into ammonium chromate or dichromate.

According to the present invention, it has been found that $Cr_2O_3$ may be converted directly to ammonium chromate by reaction with oxygen in an aqueous ammonia, i.e., ammonium hydroxide solution. Ammonium dichromate may then be produced by removing ammonia from the ammonium chromate solution.

More in particular, it has been discovered that the conversion of chromic oxide to ammonium chromate by the preceding reaction may be greatly enhanced by the use of certain catalysts, especially cupric sulfate and cobalt naphthenate.

It has also been found that where cupric sulfate is used as a catalyst for the regeneration, copper remains in the aqueous ammonium chromate solutions which are produced. The presence of the copper, as $Cu^{2+}$ ions or perhaps as a copper-ammonium complex, has in turn been found to decrease the yields of desired products, when the solutions are used for the oxidation of hydrocarbons.

It was found that the concentration of copper in ammonium chromate solutions, catalytically regenerated from chromic oxide, could be controlled by flashing off some of the ammonia from the solution to precipitate hydrated cupric oxide. It was also found that by this method, it is possible to reduce the $Cu^{2+}$ ion content to about 0.2% and that this concentration does not interfere with the oxidation of the alkyl aromatic compounds.

By flashing or otherwise removing ammonia from the regenerated ammonium chromate solution, the pH is reduced to about 7. This chromate solution may then be used directly in the oxidation of hydrocarbons without further pH adjustment. The ammonia and precipitated hydrated cupric oxide both may be recycled for use in the regeneration reaction. Thus, this method for controlling the copper content of ammonium chromate regenerated from $Cr_2O_3$ enables the regeneration method to be integrated into a continuous hydrocarbon oxidation system, as described in the above-noted co-pending patent application.

The conversion of chromic oxide to ammonium chromate by the reaction with oxygen in aqueous ammonia is enhanced by being conducted at superatmospheric pressure. The uncatalyzed reaction provides yields of from about 6% to 8%. Here and throughout the present description, the percent yield is the mole percent of Cr (VI) produced per mole of Cr (III) charged. A twofold increase in yield, to from about 13% to 16%, is obtained by the use of cobalt naphthenate as a catalyst. The use of cupric sulfate as a catalyst results in a very substantial improvement in yield to from about 30% to 45%.

The present invention may be practiced by mixing chromic oxide with aqueous ammonia in a suitable pressure vessel. Oxygen is then introduced into the vessel and the reactants are heated to form ammonium chromate. The product may then be recovered from the vessel.

The reaction conditions may be varied over wide limits, but good results are obtained within the following ranges of conditions:

Temperature _____ ° C__ 140 to more than 225
Oxygen partial pressure _____p.s.i.a__ 20 to 500
Ammonium hydroxide concentration (by weight) ammonia _____percent__ 4 to 80
$NH_3:Cr_2O_3$ mole ratio _____ 2 to 160
Reaction time _____minutes__ 15 or longer The oxygen which is used in the method of this invention can be supplied by any oxygen containing gas. Thus, pure oxygen, air, oxygen enriched air and various oxygen-nitrogen mixtures are suitable. The temperature at which the oxygen is introduced into the reaction mixture is not critical. It can be added to the mixture of chromic oxide and aqueous ammonia at room temperature or above. When the reaction is catalyzed, it is preferred to introduce the oxygen after the other ingredients have been heated to a temperature of at least 125° C.

Where the reaction is catalyzed, good results are obtained by the addition of from 0.1 to 0.6 mole of the cupric sulfate catalyst per mole of $Cr_2O_3$. Preferably, the amount of catalyst is from about 0.2 to 0.4 mole per mole of $Cr_2O_3$.

The following are illustrative examples of the practice of the invention.

*Example 1*

To a 300 ml. rocking bomb or autoclave there were added 1.80 g. of chromic oxide and 100 ml. of concentrated aqueous ammonia solution (30% $NH_3$). The autoclave was heated to 127° C. with continuous rocking and oxygen gas added to provide an oxygen partial pressure of 100 p.s.i.a. The reaction mixture was then heated to a temperature of 200° C. and the reaction allowed to proceed under these conditions for 60 minutes. The autoclave was cooled to about room temperature in a water bath, and the product was removed and isolated on a filter. A yield of 6.8% ammonium chromate was obtained.

*Example 2*

To a 300 ml. rocking autoclave there were added 1.80 g. chromic oxide, 0.40 g. cupric sulfate and 100 ml. of a 30% ammonium hydroxide solution. The mixture was heated to 127° C. with constant rocking. Oxygen was then charged into the reaction mixture to provide an oxygen partial pressure of 100 p.s.i.a. The reaction mixture next was heated to a temperature of 180° C. and the reaction was allowed to proceed for 60 minutes. After this time, the autoclave was cooled to about room temperature in a water bath, vented, and the product, ammonium chromate, was recovered. A yield of 33.3% was obtained.

*Example 3*

The procedure of Example 2 was repeated and a yield of 27.5% was obtained.

Example 4

Following the procedure of Example 2, chromic oxide was reacted with oxygen in aqueous ammonia (15% $NH_3$), but the cupric sulfate was replaced by 0.5 g. of cobalt naphthenate. A yield of 13.7% was obtained.

Example 5

Example 4 was repeated using 1.00 g. of cobalt naphthenate instead of 0.5 g. The yield was 15.8%.

Examples 6–11

The procedure of Example 2 was followed, but in each case, a different material was substituted for cupric sulfate to determine its value as a catalyst. In some cases, the reaction temperature was also varied from that used in Example 2. Otherwise the same reaction conditions were employed. The material added, the temperature employed and the yield obtained in Examples 6–11 appear in Table 1 and the results are compared with those of Examples 1–5.

TABLE 1 [1]

| Ex. No. | Catalyst | $(NH_4)OH$ Concentration as percent $NH_3$ in Solution | Reaction Temperature (° C.) | Cr (VI) Percent Yield |
|---|---|---|---|---|
| 1 | None | 30 | 200 | 6.8 |
| 2 | 0.40 g. $CuSO_4$ | 30 | 180 | 33.3 |
| 3 | 0.40 g. $CuSO_4$ | 30 | 180 | 27.5 |
| 4 | 0.5 g. cobalt naphthenate | 15 | 180 | 13.7 |
| 5 | 1.0 g. cobalt naphthenate | 15 | 180 | 15.8 |
| 6 | 0.42 g. $MnSO_4 \cdot H_2O$ | 30 | 175 | 8.2 |
| 7 | 0.42 g. $MnSO_4 \cdot H_2O$ | 30 | 200 | 7.6 |
| 8 | 0.42 g. $MnSO_4 \cdot H_2O$ | 30 | 225 | 3.4 |
| 9 | 0.42 g. $MnSO_4 \cdot H_2O$ | 30 | 250 | 0.6 |
| 10 | 0.78 g. $Ag_2SO_4$ | 30 | 180 | 7.0 |
| 11 | 1.3 g. $NiSO_4 \cdot H_2O$ | 15 | 180 | 6.3 |

[1] The tabulated results are based on the reaction of 1.80 g. chromic oxide, 100 ml. aqueous ammonium hydroxide, 100 p.s.i.a. $O_2$ partial pressure added at 127° C. and a reaction time of 60 minutes.

As can readily be seen by comparing the data in Table 1, cupric sulfate has a very significant catalytic effect on the reaction. Cobalt naphthenate also catalyzes the reaction, but the improvement in yield is not nearly so great as is realized with cupric sulfate.

It is apparent too from Examples 6–11 that other sulfate salts are relatively ineffective as catalysts. None of the sulfates employed in those reactions, including $MnSO_4 \cdot H_2O$, $Ag_2SO_4$ and $NiSO_4$, produces a significant increase in yield. In some cases, use of the other sulfates actually results in a yield which is lower than the yield obtained when the reaction is uncatalyzed.

Since it is clear from the results of Examples 1–11 that cupric sulfate is a very valuable catalyst for the conversion of $Cr_2O_3$ to $(NH_4)_2CrO_4$, experiments were conducted to determine the optimum conditions for the utilization of the catalyst.

First, a series of experiments was conducted to establish the effect of temperature and of the quantity of cupric sulfate catalyst on the yield of ammonium chromate. In keeping with the procedure of the previous examples, 1.80 g. of chromic oxide, 100 ml. of ammonium hydroxide solution (30% $NH_3$) and varying amounts of cupric sulfate catalyst were placed in a 300 ml. rocking autoclave. The reaction mixture was heated to 127° C. and gaseous oxygen was introduced until an oxygen partial pressure of 100 p.s.i.a. was obtained. The reaction mixture was then heated to the chosen temperature and the reaction was allowed to proceed for 60 minutes. The product, ammonium chromate, was isolated. The yields, amounts of $CuSO_4$ and temperatures used in these reactions are set forth in Table 2.

TABLE 2 [1]

| Run No. | Catalyst $CuSO_4$ (g.) | Reaction Temperature (° C.) | | | | | |
|---|---|---|---|---|---|---|---|
| | | 160 | 170 | 180 | 190 | 200 | 225 |
| 2-1 | 0.20 | | | 20.7 | | 19.5 | |
| 2-2 | 0.40 | [2] 9.5 | [2] 20.6 | [2] 30.3 | 26.9 | [2] 29.6 | 7.4 |
| 2-3 | 0.80 | | 27.1 | 34.8 | | 34.1 | |
| 2-4 | 1.0 | | | 26.3 | | 23.1 | |

[1] Tabulated results are based on the reaction of 1.80 g. chromic oxide, 100 ml. ammonium hydroxide (30% $NH_3$), 100 p.s.i.a. $O_2$ partial pressure added at 127° C. and 60 minutes reaction time.
[2] Average yield of two runs.

From the data in Table 2, it is clear that optimum results are obtained at a temperature of around 180° C., although, somewhat improved yields are obtained using a cupric sulfate catalyst over a reaction temperature range of from 160° to 225° C. Likewise, optimum yields appear to be realized using about 0.80 g. of catalyst, although substantially improved yields, in comparison with the uncatalyzed reaction, are obtained over the entire range of from 0.20 to 1.0 g.

Next, a series of experiments were conducted to determine the effect of variations in the concentration of $NH_3$ in the ammonium hydroxide solution upon the yield obtained using cupric sulfate as a catalyst. It should be noted that the reaction pressure increases as the percent of $NH_3$ increases due to the increase in the partial pressure of $NH_3$ in the reaction vessel. The data resulting from these experiments appears in Table 3.

TABLE 3 [1]

| Run No. | Percent $NH_3$ Contained in 100 ml. $NH_4OH$ Solution | Reaction Pressure (p.s.i.g.) | Cr (VI) Percent Yield |
|---|---|---|---|
| 3-1 | 4.5 | 235 | 25.7 |
| 3-2 | 7.5 | 260 | 27.7 |
| 3-3 | 15.0 | 340 | 29.5 |
| 3-4 | 22.5 | 460 | 29.7 |
| 3-5 | 30.0 | 625 | [2] 30.3 |
| 3-6 | ([3]) | 1,000 | [2] 3.8 |

[1] The tabulated results are based on the reaction of 1.80 g. chromic oxide, 0.40 g. $CuSO_4$ catalyst, 100 p.s.i.a. $O_2$ added at 127° C. and 60 minutes reaction time.
[2] Average yield of two runs.
[3] Concentrated $NH_4OH$ 30.0, plus $NH_3$ gas (100 p.s.i.a. $NH_3$ pressure at 125° C.).

From the data in Table 3, it is clear that the yield of ammonium chromate increases as the concentration of $NH_3$ in the ammonium hydroxide solution increases up to about 30%. At this point, the solution is saturated. The yield drops sharply where $NH_3$ gas is added to the concentrated (30% $NH_3$) $NH_4OH$ solution. The optimum amount of $NH_3$ is about 7–15%. At $NH_3$ concentrations above 15%, some of the ammonia is oxidized to nitrogen and nitrous oxide which reduces the efficiency of the operation.

The effect of an increase in oxygen partial pressure was studied in another series of experiments. The results appear in Table 4.

TABLE 4 [1]

| Run No. | $O_2$ Partial Pressure Added at 127° C. (p.s.i.a.) | Cr (VI) Percent Yield |
|---|---|---|
| 4-1 | 100 | 29.5 |
| 4-2 | 200 | 44.1 |
| 4-3 | 225 | 45.3 |

[1] The tabulated results are based on the reaction of 1.80 g. chromic oxide, 100 ml. of aqueous ammonium hydroxide solution (15% $NH_3$), 0.40 g. $CuSO_4$ catalyst, 180° C. reaction temperature and 60 minutes reaction time.

The process of this invention has been described in full detail and has been illustrated by a large number of specific examples. It will, therefore, be obvious to those

What is claimed is:

1. The method for producing ammonium chromate comprising reacting at an elevated temperature for at least about 15 minutes chromic oxide, aqueous ammonia and oxygen in the presence of a catalyst selected from the group consisting of cupric sulfate and cobalt naphthenate, wherein, said aqueous ammonia has an ammonia content of from 4% to 30% by weight, and the mole ratio of said ammonia to said chromic oxide in the mixture is in the range of from 2 to 16, the oxygen partial pressure is from 20 to 500 p.s.i.a., said temperature is in the range of from about 140° to about 225° C.

2. The method of claim 1 wherein the catalyst is cupric sulfate and is present in an amount of at least 0.1 mole per mole of the chromic oxide.

3. The method of claim 1 wherein the ammonia content of said aqueous ammonia is from 4.5% to 15% by weight.

4. The method for producing ammonium chromate comprising:

mixing chromic oxide and aqueous ammonia having an ammonia content of from 4% to 30%, the mole ratio of said ammonia to said chromic oxide in the mixture being in the range of from 2 to 16, to provide a distinctly alkaline solution, placing the mixture of chromic oxide and aqueous ammonia into an autoclave under an oxygen partial pressure of from 20 to 500 p.s.i.a., heating said mixture in the presence of cupric sulfate as a catalyst at a temperature of from 140° to 225° C. to produce a solution containing ammonium chromate, and flashing off ammonia from said solution of ammonium chromate to thereby reduce the solution to a pH of about 7 and to precipitate residual copper ions as hydrated copper oxide.

References Cited

UNITED STATES PATENTS

| | | | |
|---|---|---|---|
| 1,955,326 | 4/1934 | Demant | 23—56 |
| 2,012,061 | 8/1935 | Demant | 23—56 |
| 2,012,062 | 8/1935 | Demant | 23—56 |
| 2,501,952 | 3/1950 | Maier | 23—56 |
| 2,879,134 | 3/1959 | Halpern | 23—56 X |

MILTON WEISSMAN, *Primary Examiner.*

OSCAR R. VERTIZ, *Examiner.*

B. H. LEVENSON, *Assistant Examiner.*